Feb. 15, 1927.
R. D. WORK ET AL
1,617,932
METER AND METER READING DEVICE
Filed June 15, 1926   2 Sheets-Sheet 1
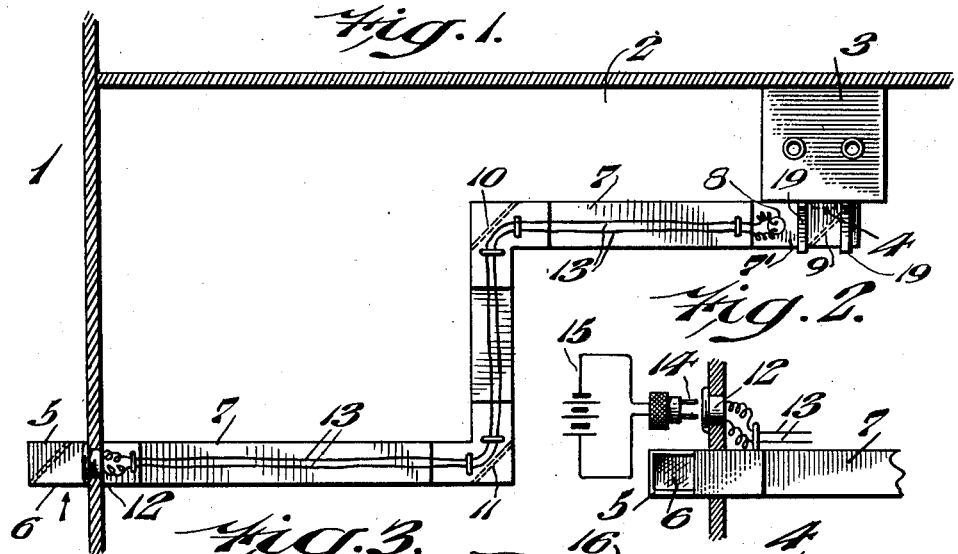
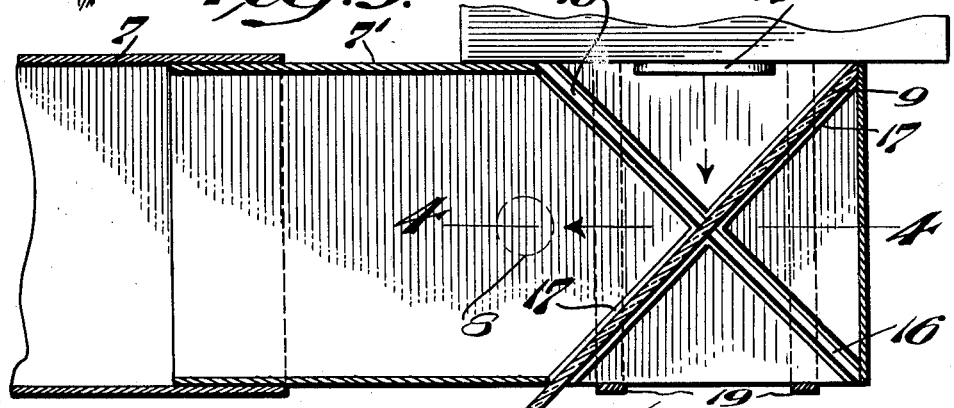
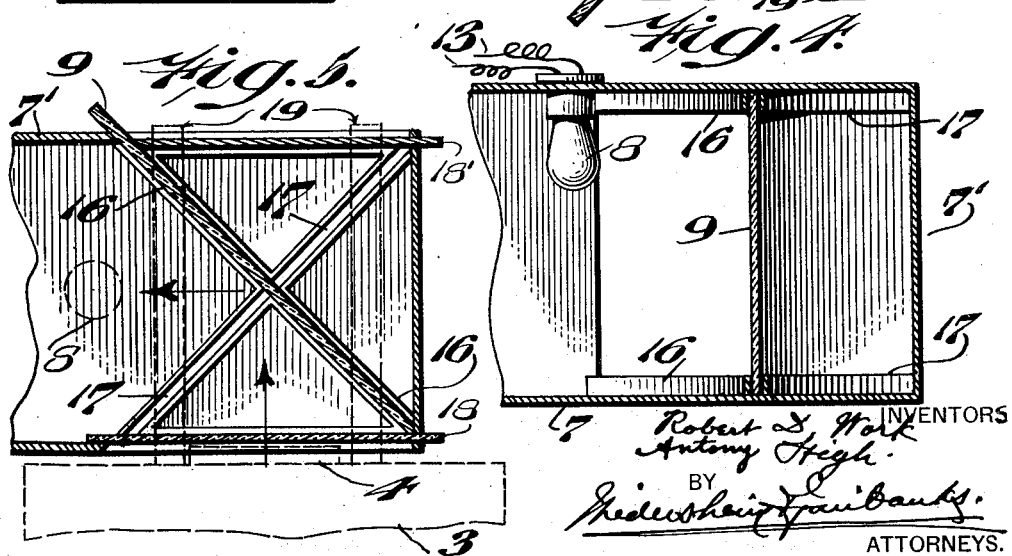
INVENTORS
Robert D. Work
Antony Hegh
BY
[signature]
ATTORNEYS.

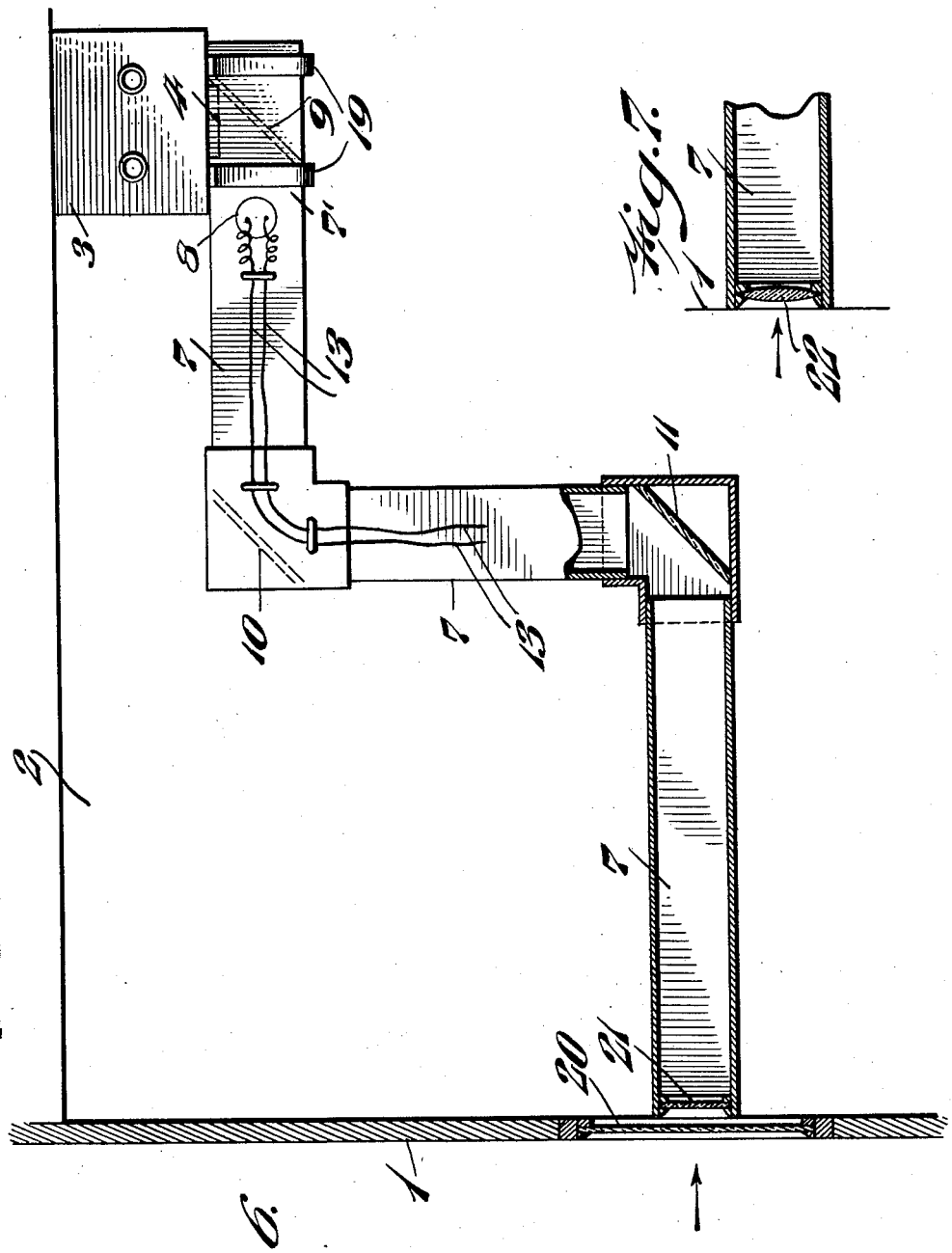

Patented Feb. 15, 1927.

1,617,932

UNITED STATES PATENT OFFICE.

ROBERT D. WORK AND ANTONY HIGH, OF PHILADELPHIA, PENNSYLVANIA.

METER AND METER-READING DEVICE.

Application filed June 15, 1926. Serial No. 116,179.

This invention, generally stated, relates to a meter and a device for reading a meter within a building through a cellar window or a peep-hole arranged exteriorly of the building and has more particular relation to an arrangement whereby our novel meter structure through the intervention of a plurality of reflectors may be so illuminated by a portable device for the reading of such a meter from the exterior of a building.

The leading object of the present invention may be said to reside in the provision of a novel meter and means operative for the reading of gas, electric, or other meters from a position exteriorly of a building, thus making it unnecessary for the meter inspector to enter the building interior.

A further object of the present invention is to provide a structure of the character above stated so constructed that the inspector by means of a portable battery may effect electrical communication with a bulb arranged adjacent the meter so that a reading of the meter may be readily determined from the building exterior without ingress of the inspector thereto.

Other and further objects reside in the provision of general details of construction, arrangement and combination of parts whereby the above objects may be facilitated.

The invention consists of the novel construction hereinafter described and finally claimed.

The nature, characteristic features and scope of the invention will be more fully understood from the following description taken in connection with the accompanying drawings forming part hereof, and in which:

Fig. 1, is a fragmentary view in sectional plan showing the arrangement of meter, peep-hole, and conduit connecting the meter and peep-hole.

Fig. 2, is a fragmentary view looking in the direction of the arrow in Fig. 1 and illustrating the inspector's battery and plug for establishing electrical connection with the bulb in front of the meter as shown in Fig. 1.

Fig. 3, is a fragmentary view in plan and principally in section of the right hand side of Fig. 1.

Fig. 4, is a fragmentary view taken upon the section line 4—4 of Fig. 3.

Fig. 5, is a view in horizontal plan principally sectioned illustrating a detail of construction hereinafter described.

Fig. 6, is a view similar to Fig. 1 except that it shows a slightly modified form.

Fig. 7, is a fragmentary view showing a still further modified form.

For the purpose of illustrating our invention we have shown in the accompanying drawings several forms thereof which are at present preferred by us, since the same have been found in practice to give satisfactory and reliable results, although it is to be understood that the various instrumentalities of which our invention consists can be variously arranged and organized and that our invention is not limited to the precise arrangement and organization of the instrumentalities as herein shown and described.

Referring to the drawings, the reference numeral 1 designates a structure which may be a building of any desired architectural type, for instance, an hotel, an apartment, or other building. Within the structure 1, preferably in the cellar or basement 2 thereof is positioned a meter 3 which may be a gas meter, an electric meter, or other meter having a dial 4 for reading of the meter. Exteriorly of the building or structure 1 there may be, as in the case of a new building, a peep-hole 5 within which is located a reflector 6, see Figs. 1 and 2. Connecting the peep-hole 5 and meter 3 is a closed conduit 7. The conduit 7 obviously may be arranged to suit various structural conditions and as shown is Fig. 1 is of elbow construction. Arranged within the conduit and before dial 4, or substantially before the dial, is an electric bulb 8 for illuminating the dial 4 when the said bulb is energized in a manner to be presently described. Also arranged before the dial 4 is a reflector 9. Also arranged within conduit 7 are other reflectors 10 and 11 whereby when the bulb 8 is energized for illuminating purposes a reading of meter 3 may be had from reflector 9 to reflector 10 to reflector 11, and thence to reflector 6 as can be clearly observed from Fig. 1. The outer wall of the structure 1 is provided with a socket 12 connecting which and the bulb 8 are feed and return conductors 13. Should an inspector desire to take a reading of meter 3 it is merely necessary for said inspector to insert in socket 12 a portable plug 14 provided with a battery 15 for energizing the lamp 8. Thus a reading of the meter may be obtained through said peep-hole without entering the building, the advantages of which are readily apparent.

In case of an old building instead of going to the expense of a peep-hole the inspector may insert his plug in socket 12 and inspect his meter reading through the window.

In Figs. 3 and 5 we have illustrated an X-shaped member by which reflector 9 may be interchangeably arranged for right hand and left hand readings. In other words, should it be desired to make a left hand reading instead of a right hand reading as shown in Figs. 1 and 2 the reflector 9 may be fitted to the groove 16 instead of the groove 17. In this connection it will be observed that the conduit 7 is telescopically provided with a part 7′ in which is located the electrical bulb 8 and the X-shaped reflector receiving member. Thus the peep-hole 5 and conduit 7 may be reversely and interchangeably arranged with respect to the part 7′ which is adapted to be secured before the meter 3.

In connection with the X-shaped reflector receiving member it is to be noted that if desired a transparent sheet of glass 18 may be caused to slidably engage member 7′ in order to preclude dust and dirt from penetrating the member 7′ and conduit 7.

Obviously the transparent sheet of glass 18 is positioned opposite the dial 4 of the meter 3 and may be reversibly positioned in accordance with the arrangement of the conduit 7. Opposite the transparent sheet 18 we prefer to arrange a non-transparent sheet of material 18′ as metal, which sheet 18′ in conjunction with the glass member 18 serves to preclude the entry of dust, dirt and the like into member 7′ and conduit 7.

In practice we secure the member 7′ with respect to meter 3 by means of straps 19, clearly shown in Figs. 1, 3, and 5. The part 7′ as attached to the meter as before mentioned is secured by means of straps 19 to effect a cheap, novel and removable connection of meter and conduit. Thus, in a new installation the meter and part 7′ may be installed as a unit and in the case of a repair job the straps 19 may be employed to effect the same result so that the straps may be detached to repair the meter.

In Fig. 6 we have shown a slightly modified form in which the peep-hole is omitted and the building structure 1 is provided with a conventional cellar window 20. The conduit 7 leading from the meter 3 as shown in Fig. 1 stops immediately before the cellar window 20 and is closed by a sheet of glass 21. Thus, in the case of an old building where it would be an added expense to provide a peep-hole the cellar window 20 may be employed as a means for the meter inspector looking through a conduit 7 for a meter reading. In this particular instance the plate of glass 21 serves to prevent dust and dirt entering conduit 7.

In Fig. 7 the construction is the same as shown in Fig. 6 with the exception that instead of the plate of glass 21 a lens 22 is employed whereby a magnified reading of the meter may be obtained.

It will now be apparent that we have devised a novel and useful construction which embodies the features of advantage enumerated as desirable in the statement of the invention and the above description and while we have in the present instance shown and described the preferred embodiments thereof which have been found in practice to give satisfactory and reliable results, it is to be understood that the same is susceptible of modification in various particulars without departing from the spirit or scope of the invention or sacrificing any of its advantages.

What we claim is:

1. In a device of the character stated, a meter including its complemental dial, a peep-hole including its complemental reflector, a closed conduit extending from said meter to the peep-hole, reflectors within said conduit for properly reflecting dial readings to the peep-hole reflector, an incandescent bulb arranged to illuminate the meter dial, a socket for said peep-hole, conductors electrically connecting said bulb and socket and portable means for establishing electrical connection between said socket and bulb.

2. In a device of the character stated, a meter including its complemental dial, a peep-hole including its complemental reflector, a closed conduit extending from said meter to the peep-hole, reflectors including means to adjustably position that reflector adjacent said meter within said conduit for properly reflecting dial readings to the peep-hole reflector, an incandescent bulb arranged to illuminate the meter dial, a socket for said peep-hole, conductors electrically connecting said bulb and socket and portable means for establishing electrical connection between said socket and bulb.

3. In a device of the character stated, a meter including its complemental dial, a peep-hole including its complemental reflector, a closed conduit extending from said meter to the peep-hole, reflectors including X-shaped means to adjustably position that reflector adjacent said meter within said conduit for properly reflecting dial readings to the peep-hole reflector, an incandescent bulb arranged to illuminate the meter dial, a socket for said peep-hole, conductors electrically connecting said bulb and socket, and portable means for establishing electrical connection between said socket and bulb.

4. In a device of the character stated, a meter including its complemental dial, a peep-hole including its complemental reflector, a closed conduit extending from said meter to the peep-hole, reflectors including X-shaped means to adjustably position that reflector adjacent said meter within said conduit for properly reflecting dial readings to the peep-hole reflector, an incandescent bulb arranged to illuminate the meter dial, a socket for said peep-hole, conductors electrically connecting said bulb and socket, portable means for establishing electrical connection between said socket and bulb, and a transparent slide adaptable for interchangeable arrangement upon opposed sides of said X-shaped means.

5. In a device of the character stated, a meter including its complemental dial, means including its complemental reflector to obtain a meter reading from a building exterior, a closed conduit extending from said meter to said means, reflectors within said conduit for properly reflecting dial readings to said means from said reflector, an incandescent bulb arranged to illuminate the meter dial, a socket for said means, conductors electrically connecting said bulb and socket and portable means for establishing electrical connection between said socket and bulb.

ROBERT D. WORK.
ANTONY HIGH.